Feb. 5, 1957

R. L. BRIGHT 2,780,782

PULSE WIDTH MODULATOR

Filed Nov. 4, 1955

WITNESSES:

INVENTOR
Richard L. Bright

BY
ATTORNEY

United States Patent Office 2,780,782
Patented Feb. 5, 1957

2,780,782

PULSE WIDTH MODULATOR

Richard L. Bright, Hempfield Township, Westmoreland County, Pa., assignor to Westinghouse Electric Corporation, East Pittsburgh, Pa., a corporation of Pennsylvania Application November 4, 1955, Serial No. 544,867

6 Claims. (Cl. 332—12)

This invention relates to devices for deriving a train of pulses having a fixed frequency and a pulse width which is proportional to an applied control voltage. More specifically, it relates to a device of the type described which employs a saturable magnetic core member to achieve pulse width modulation.

In general, a modulator may be defined as a device for varying a particular characteristic of a waveform as a function of a control signal. Common types of modulation include amplitude modulation in which the amplitude of a waveform is varied in response to a control signal, and frequency modulation in which the frequency characteristic of a waveform is varied. Pulse width modulators, on the other hand, are usually concerned with square wave signals and are used to vary the pulse width or time duration of a train of square wave voltage pulses as a function of a direct current control voltage, while maintaining the frequency of the pulses constant.

It is an object of this invention to provide a new and improved pulse width modulator of the type described above.

Another object of the invention resides in the provision of a pulse width modulator employing a saturable magnetic core together with means for varying the saturation time of the core as a function of a control voltage to thereby achieve pulse width modulation.

A further object of the invention is to provide a pulse width modulator for producing a train of output square wave voltage pulses in which the polarity of successive pulses is reversed.

A still further object of the invention lies in the provision of a pulse width modulator capable of producing a reversible polarity output.

The above and other objects and features of the invention will become apparent from the following detailed description taken in connection with the accompanying drawings which form a part of this specification, and in which.

Figure 1:
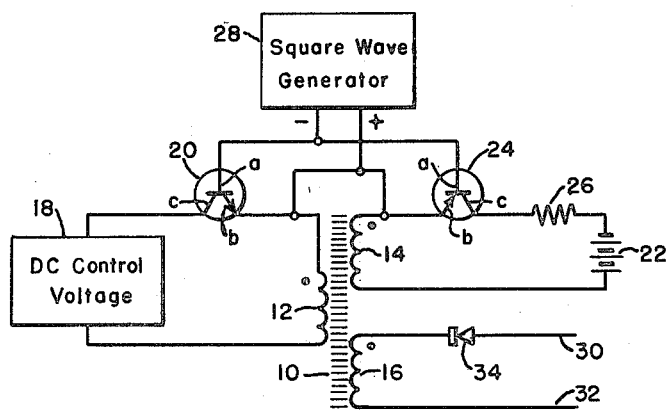
Figure 1 is a schematic diagram of one embodiment of the invention.
Figure 2:
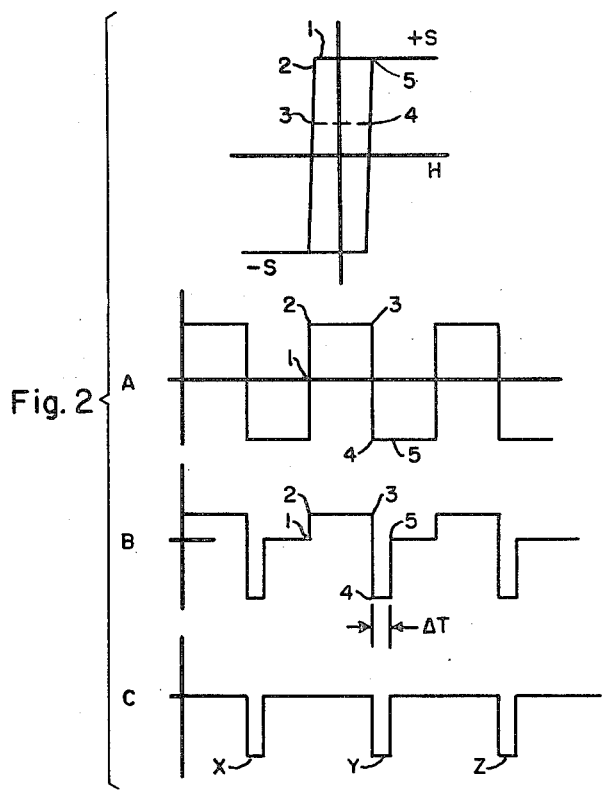
Fig. 2 is a graphical illustration of the operation of the pulse width modulator shown in Fig. 1.

Referring to Fig. 1, the embodiment of the invention shown comprises a saturable magnetic core member 10 having three windings 12, 14 and 16 inductively coupled thereto. Core 10 is formed from rectangular hysteresis loop material, such as Hypernik V. The hysteresis curve for this type of material is shown at the top of Fig. 2 where the quantity H represents field intensity measured in ampere turns per unit of length, and the quantity B represents flux density measured in webbers per square unit of area. It can be seen that the core material presents a sharp cutoff point between conditions of saturation (i. e., constant B as H increases) and unsaturation. There are two regions of saturation marked by the straight line portions +S and —S. The core will saturate in the +S region when its flux density reaches a certain level in one direction (which will be called the positive direction). In a similar manner, it will saturate in the —S region when its flux density reaches a certain level in the other direction (which will be called the negative direction). In accordance with well known magnetic theory, the windings 12, 14 and 16 present a much lower impedance when the core 10 is saturated than when it is unsaturated. Windings 12, 14 and 16 are wound on core 10 in the same manner so that the induced voltages appearing across these windings will have the same relative polarities. Points of like instantaneous polarity are indicated on the drawing by dots.

Winding 12 is connected to a source of variable direct current control voltage 18 through the emitter and collector of an NPN junction transistor 20. In a similar manner winding 14 is connected to a fixed source of direct current voltage, such as battery 22, through the emitter and collector of a PNP junction transistor 24 and a resistor 26. The output of a square wave generator 28 is applied in parallel between the emitter and base of transistors 20 and 24.

The NPN junction transistor 20 consists of a crystal of p-type germanium bounded by two n-type regions. The p-type germanium constitutes the base $a$ of the transistor of the two n-type regions are affixed to the emitter $b$ and collector $c$, respectively. The junctions between the p-type and n-type germanium sections act as rectifiers. Very little, if any, current flows through the transistor when the p-type base is negative relative to the n-type emitter, whereas a relatively large current flows when the p-type base is positive relative to the n-type emitter by as little as a fraction of a volt. The PNP transistor 24 is essentially the reverse of transistor 20. It consists of a crystal of n-type germanium, constituting the base $a$, bounded by two p-type regions which are affixed to the emitter $b$ and collector $c$. In this case the transistor will conduct current in the conventional sense from emitter to collector only when its base is negative relative to the adjoining p-type regions.

Since the output of square wave generator 28 is applied between the emitter and base of transistors 20 and 24, it controls their operation in an obvious manner. When the square wave output is positive, transistor 20 will conduct; and, when negative, transistor 24 will conduct. In this manner the transistors act as switches to control the application of voltage sources 18 and 22 to windings 12 and 14, respectively. Obviously, the circuit will operate in the same manner if two PNP or two NPN transistors are used and their connections to generator 28 are reversed with respect to each other to achieve an alternate switching action.

Winding 16 is used to derive an output voltage from the modulator, appearing between output terminals 30 and 32. Rectifier 34 serves to block voltages of one polarity in the output circuit.

When the output of square wave generator 28 has the polarity shown, PNP junction transistor 24 will conduct, and NPN transistor 20 will be cut off. The voltage supplied by battery 22 is made approximately equal to $$4N_{14}\phi_s f$$

where:

$N_{14}$ = the number of turns in winding 14;
$\phi_s$ = the saturation flux of core 10 measured in webbers; and
$f$ = the frequency of the applied square wave in cycles per second.

Consequently, the voltage supplied by battery 22 is capable of changing the flux from $-\phi_s$ to $+\phi_s$ in one half-cycle. Or, as shown in Fig. 2, the flux density is capable of changing from the +S region to the —S region in one half-cycle of the applied square wave.

If it is assumed that the control voltage from source 18 is zero, core 10 will go to saturation in, say, the positive direction during the half-cycle of the applied square wave that transistor 24 is conducting. Since there is no control voltage from source 18 under the conditions assumed, the flux will not change during the half-cycle that transistor 20 is in condition to conduct. When transistor 24 conducts again on the next half-cycle, there can be no further flux change since the core is already saturated; and, therefore, the source voltage 22 appears across resistance 26 and no voltage appears at output terminals 30 and 32.

The effect of applying a control voltage to winding 12 can best be explained by examining the induced voltage equation for an inductor. This equation, as applied to winding 12, is:

$$B = \frac{k}{N_{12}A_{10}} \int e\, dt$$

where:

$B$ = flux density measured in webbers per square unit of area;
$k$ = a constant;
$N_{12}$ = number of turns in the inductor 12;
$A_{10}$ = cross sectional area of core 10;
$e$ = instantaneous applied voltage; and
$t$ = time in seconds.

It can be seen that the flux density depends upon the product $\int e\, dt$, measured in volt seconds. In other words, the flux density depends upon the applied voltage and the time duration of that voltage. It is therefore possible to achieve a particular value of flux density $B$ with many different voltage levels by varying the time duration of the different voltage levels so that the product $\int e\, dt$ is always equal to the said particular value. It, of course, follows that it is possible to reach the saturation level of flux density with many different variations of the factor $\int e\, dt$.

If a control voltage is applied to winding 12 from source 18 it will decrease the flux density of core 10 during the half-cycle that transistor 20 conducts by an amount $$\Delta B = \frac{k}{N_{12}A_{10}} \int e\, dt$$

When transistor 24 again conducts the flux density is again forced to saturation in the time $$\Delta t = N_{14} \frac{B}{A_{10}} = \frac{N_{14}}{N_{12}} \int e\, dt$$

where $N_{14}$ is the number of turns in winding 14 and the other symbols correspond to those given above. If the voltage $e$ is constant the equation becomes $$\Delta t = \frac{N_{14}}{N_{12}} \times \frac{e}{2f}$$

where $f$ is the frequency of the applied square wave. The duration of the voltage pulse appearing across winding 16 is, therefore, directly proportional to the voltage $e$ from source 18.

Operation of the circuit is graphically illustrated in Fig. 2. Wave form A in Fig. 2 represents that of the applied square wave from generator 28 and wave form B represents that appearing across output winding 16. It will be assumed that the core is originally saturated in the +S region. During this time, transistor 24 will be conducting. When transistor 24 cuts off on the next half-cycle and transistor 20 begins to conduct, core 10 will be driven from its saturation level in the +S region to a condition of unsaturation. This is illustrated in Fig. 2 by the numbered points on the hysteresis curve and wave forms A and B which indicate (in approximation) corresponding points in time. When the core is saturated at point 1 in the +S region, the square wave output of generator 28 will be just starting its positive half-cycle. Immediately, the flux density of core 10 decreases to a point where it becomes unsaturated, and consequently an output voltage appears across winding 16 at point 2. The flux density of core 10 will approach the —S region by an amount dependent upon the product $\int e\, dt$ until point 3 is reached on the hysteresis curve. Between points 3 and 4 the polarity of the output of square wave generator 28 reverses. Consequently, transistor 20 now cuts off and transistor 24 conducts to build up the flux density of core 10 in the positive direction, approaching the +S region of saturation. The time required to reach saturation in the positive direction depends upon the amount of flux build-up in the negative direction during the preceding half-cycle. In wave form B this time is indicated by $\Delta t$. When saturation is again reached (point 5) the output voltage returns to zero. Rectifier 34 in the present embodiment will pass negative signals only. Consequently, the output wave form appearing at terminals 30 and 32 will appear as wave form C in Fig. 2. The pulse width of the output voltage pulses X, Y and Z is dependent upon the time $\Delta t$; and this factor is, in turn, dependent upon the magnitude of the control voltage from source 18. The modulator thus provides a means for producing a train of output pulses, the width of which is a function of the voltage from source 18. By increasing the voltage supplied by source 18 the time $\Delta t$ and the width of the output pulses can be increased to a maximum equalling the pulse width of the output pulses from square wave generator 28.

Figure 3:
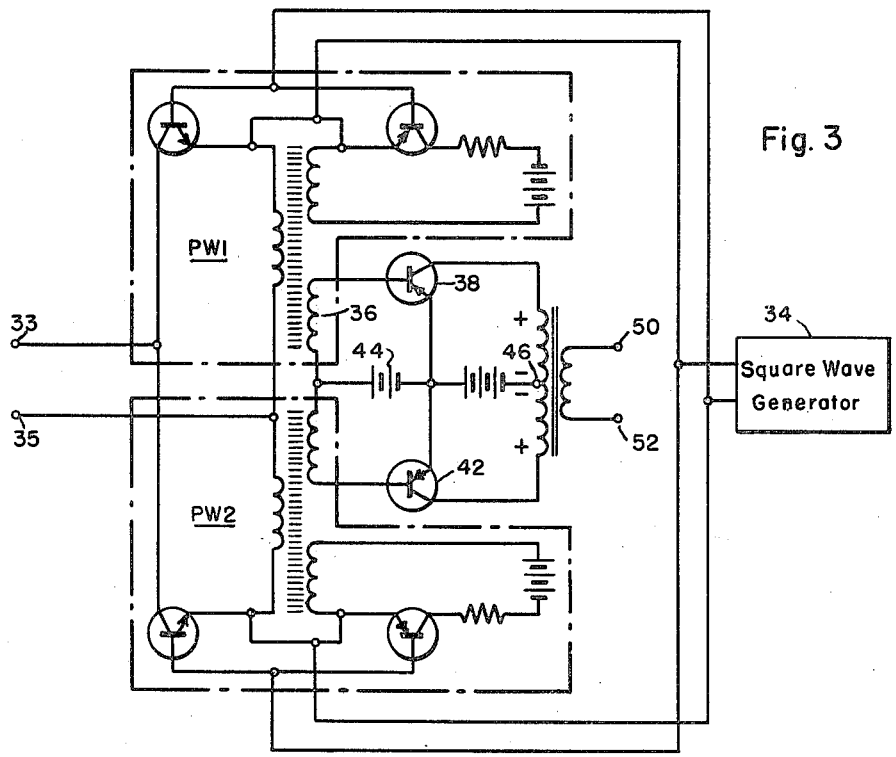
Fig. 3 is a schematic diagram of a modification of the invention which is capable of producing successive output square wave voltage pulses having opposite polarities.

Two of the pulse width modulators shown in Fig. 1 can be combined to create a pulse width modulator which gives an output train of pulses having alternating polarities. Such a configuration is shown in Fig. 3. Two pulse width modulators PW1 and PW2, identical to the modulators shown in Fig. 1, are provided. A source of control voltage, not shown, may be connected to terminals 33 and 35. Square wave generator 34 has its output connected to modulators PW1 and PW2 with reversed polarities, so that modulator PW1 will produce an output pulse on one half-cycle of the applied square wave while modulator PW2 will produce an output pulse on the other half-cycle. The output winding 36 of modulator PW1 is connected between the base and emitter of a first PNP junction transistor 38; and the output winding 40 of modulator PW2 is connected between the emitter and base of a second PNP junction transistor 42. A battery 44 serves to bias the bases of these transistors positive with respect to their emitters. Consequently, the transistors will pass signals of one polarity only. These signals constitute pulses, similar to those shown by wave form C in Fig. 2, which are modulated in width. The emitter-to-collector circuits of transistors 38 and 42 each include one-half of the primary winding 46 of a center-tapped transformer 48. The output pulses from transistor 38 will appear across the top half of winding 46 with the polarity shown, and those from transistor 42 will appear across the bottom half with the polarity shown. Consequently, since transistors 38 and 42 conduct on alternate half-cycles of the applied square wave signal, two output pulses of alternate polarity will appear at output terminals 50 and 52 for each cycle of the applied square wave. The width of these pulses will, of course, depend upon the magnitude of the control voltage applied to input terminals 33 and 35 in accordance with the description of operation of the pulse width modulator given above.

Figure 4:
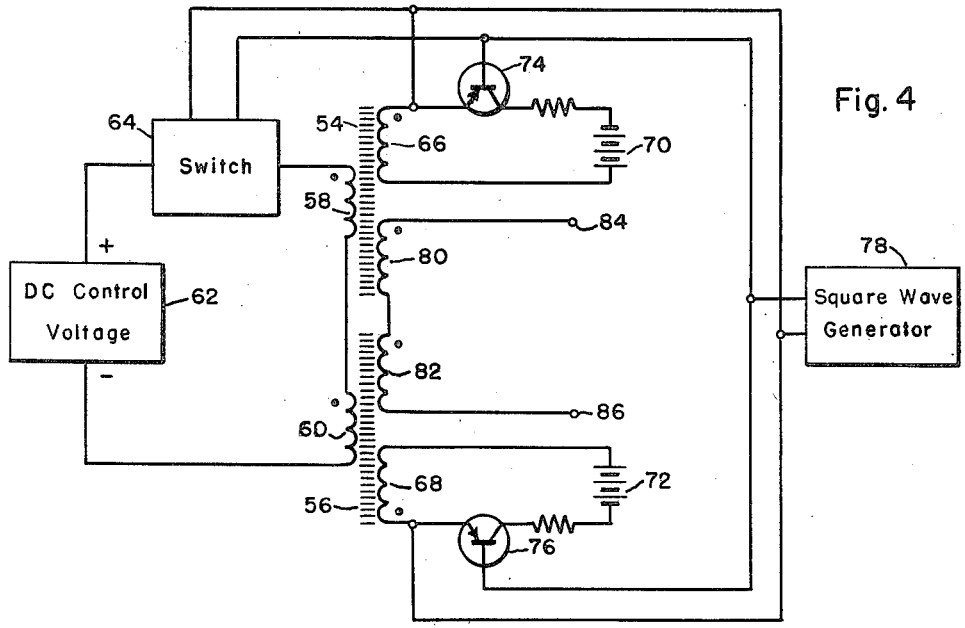
Fig. 4 is still a further modification of the invention capable of producing a train of pulse width modulated voltage pulses of either polarity.

In Fig. 4 a pulse width modulator is shown which will produce a train of output pulses of one polarity, but the polarity of the train of pulses may be reversed by reversing the polarity of the D. C. control voltage applied to the modulator. As shown, it comprises a pair of magnetic core members 54 and 56 formed from substantially rectangular hysteresis loop material having a hysteresis curve such as that shown in Fig. 2. A primary winding 58 for core 54 and a winding 60 for core 56 are connected in series, and the series combination is connected to a source of direct current control voltage 62 through a switching device 64, shown in block form. The output polarity of control voltage source 62 may be reversed by any suitable means, not shown. Cores 54 and 56 have secondary windings 66 and 68, respectively, coupled thereto. Sources of voltage, such as batteries 70 and 72, are applied across secondary windings 66 and 68 and through PNP junction transistors 74 and 76. The output of a square wave generator 78 is applied between the emitter and base of transistors 74 and 76 with the same polarity, so that the transistors are rendered conductive during the same half-cycle of the applied square wave. Tertiary windings 80 and 82, connected in series, are adapted to take an output voltage from cores 54 and 56. This output voltage will, in obvious manner, appear across output terminals 84 and 86. Like instantaneous polarities of induced voltages in the windings are again indicated by dots as they were in Fig. 1.

Square wave generator 78 is also connected to switching device 64. Any suitable switching device may be used here which will open when transistors 74 and 76 are conductive during the negative half-cycle of the output of generator 78 and which will close during the positive half-cycle of the output of generator 78. One type of switching device which I have found to work satisfactorily employs serially connected junction transistors and is shown and described in my copending application, Serial No. 438,060, filed June 21, 1951.

It can be seen that since the windings 66 and 68 have opposite relative polarities, they will saturate their cores in opposite directions. The windings 58 and 60, however, have the same relative polarities. Consequently, they will tend to saturate their cores in the same direction, but the direction of saturation produced by these primary windings may be reversed by reversing the polarity of voltage source 62. As was the case with the modulator shown in Fig. 1, the voltage supplied by batteries 70 and 72 is equal to $4N\phi_s f$ so that these voltage sources are capable of saturating their associated cores during one half-cycle of the applied square wave.

For purposes of explanation it will be assumed that the output of voltage source 62 has the polarity shown. During the negative half-cycle of the applied square wave, switch 64 will be open and transistors 74 and 76 will be conductive. Consequently, cores 54 and 56 will saturate during this half-cycle. On the succeeding positive half-cycle switch 64 will close and transistors 74 and 76 will be cut off. With the polarity of the source 62 as shown, the current through winding 58 will tend to saturate core 54 in a sense opposite to the direction of saturation produced by the winding 66. Consequently, on the succeeding half-cycle of the applied square wave, an output pulse will appear across winding 80 and output terminals 84 and 86 with a pulse width determined by the magnitude of voltage source 62. The current through winding 60, however, will tend to produce flux in core 56 in the same direction as the flux produced by winding 68 and battery 72. Core 56 will therefore remain in its saturated condition, and on the next half-cycle of the applied square wave no voltage will appear across winding 82.

If the polarity of voltage source 62 is reversed with respect to the polarities shown in Fig. 4, the process described above will be reversed, that is, core 54 will remain saturated during succeeding half-cycles of the applied square wave, but core 56 will become periodically unsaturated to produce output voltage pulses across winding 82. Since windings 80 and 82 are wound to have the same instantaneous relative polarities, and since the direction of flux change in core 54 is opposed to that in core 56, the output pulses at terminals 84 and 86 will have a polarity dependent upon the polarity of the voltage supplied from source 62.

Although the invention has been described in connection with certain specific embodiments, it will be readily apparent to those skilled in the art that various changes in form and arrangement of parts can be made to suit requirements without departing from the spirit and scope of the invention.

I claim as my invention:

1. A pulse width modulator comprising, in combination, a magnetic core member, first, second and third winding means inductively coupled to said core member, a source of direct current voltage and a first junction transistor connected in series with said first winding means, a source of variable control voltage and a second junction transistor connected in series with said second winding means, means for rendering said junction transistors alternately conductive, and means for deriving an output voltage from said third winding means.

2. A pulse width modulator comprising, in combination, a magnetic core member of rectangular hysteresis loop material, first, second and third winding means inductively coupled to said core member, a source of direct current voltage and a first semiconductive transistor, means interconnecting said first winding means, said direct current voltage source and said first transistor whereby the magnetic core member will be driven to saturation when the first transistor is rendered conductive, a source of variable voltage and a second semiconductive transistor, means interconnecting said variable voltage source, said second transistor and said second winding means whereby the variable voltage will be applied across said second winding means when the second transistor is rendered conductive, means for rendering said first and second semiconductive transistors conductive alternately, and means for deriving an output voltage across said third winding means.

3. A pulse width modulator comprising, in combination, a magnetic core member, first and second winding means inductively coupled to said core member, a first source of voltage and a first normally open switching device, means interconnecting said first winding means, said first voltage source and said first switching device whereby the magnetic core member will be driven to saturation when the first switching device is closed, a second source of voltage and a second normally open switching device, means interconnecting said second voltage source, said second switching device and said second winding means whereby at least a portion of said second voltage source will be applied across said second winding means when said second switching device is closed, means for alternately closing said first and second switching devices, and means inductively coupled to said core member for deriving an output from said modulator.

4. In combination with a square wave generator and a source of variable direct current voltage, a pulse width modulator comprising a saturable magnetic core member, first and second winding means inductively coupled to said core member, a source of direct current and a first transistor connected in series circuit arrangement with said first winding means, a second transistor connected in series circuit arrangement with said second winding means, said first and second transistors being complementary PNP and NPN junction transistors, means for applying the output of said square wave generator between the emitter and the base of both of said transistors, means for applying said source of variable direct current voltage across the series combination of said second transistor and said second winding means, and means inductively coupled to said core member for deriving an output voltage from said modulator.

5. A pulse width modulator comprising, in combination, first and second magnetic core members of substantially rectangular hysteresis loop material, first, second and third winding means inductively coupled to each of said core members, a first transistor and a source of voltage connected in series with the first winding means of one of said core members, a second transistor and a source of voltage connected in series with the first winding means of the other of said core members, a third transistor and a source of variable control voltage connected in series with the second winding means of said one core member, a fourth transistor and said source of variable control voltage connected in series with the second winding means of said other core member, means for rendering said first and third transistors alternately conductive and said second and fourth transistors alternately conductive, means for connecting the third winding means of said core members in a series arrangement, fifth and sixth transistors having their respective bases connected to the opposite ends of said series-connected third winding means, means connecting the emitters of said transistors to the junction of said third winding means, an output transformer, a primary winding for said transformer having its opposite ends connected to the respective collectors of said fifth and sixth transistors and its midpoint connected to the emitters of said fifth and sixth transistors, and a secondary winding inductively coupled to said output transformer to derive an output voltage from said modulator.

6. A pulse width modulator capable of producing successive output voltage pulses of alternate polarity comprising, in combination, first and second magnetic core members of substantially rectangular hysteresis loop material, primary winding means for each of said core members, means connecting said primary winding means in series, a source of variable voltage, means including a switching device for applying said source of variable voltage across the series combination of said primary winding means, secondary winding means for each of said core members, a source of direct current voltage and a switching device connected in series with each of said secondary winding means, means for deriving an output from said modulator and including a tertiary winding means for each of said core members, said tertiary winding means being connected in series, and means for controlling the operation of said switching devices.

References Cited in the file of this patent

UNITED STATES PATENTS

| | | |
|---|---|---|
| 2,709,225 | Pressman | May 24, 1955 |
| 2,721,899 | Krumhansl et al. | Oct. 25, 1955 |